United States Patent [19]

Inagaki et al.

[11] Patent Number: 4,800,288

[45] Date of Patent: Jan. 24, 1989

[54] OPTICAL IMAGE TRANSFORMATION APPARATUS

[75] Inventors: Shintaro Inagaki, Ebina; Akira Kobayashi, Fujisawa, both of Japan

[73] Assignee: Anritsu Corporation, Tokyo, Japan

[21] Appl. No.: 72,417

[22] Filed: Jul. 13, 1987

[30] Foreign Application Priority Data

Jul. 18, 1986 [JP] Japan ................. 61-170594

[51] Int. Cl.⁴ ............................. H01J 40/14
[52] U.S. Cl. .................... 250/578; 365/112
[58] Field of Search ........... 250/578; 324/77 K; 364/822; 365/109, 112

[56] References Cited

U.S. PATENT DOCUMENTS

| | | | |
|---|---|---|---|
| 4,161,034 | 7/1979 | Stark | 364/822 |
| 4,286,328 | 8/1981 | Bocker | 364/821 |
| 4,611,124 | 9/1986 | Schneider | 250/578 |

FOREIGN PATENT DOCUMENTS 61-222106 3/1986 Japan .
62-15401 1/1987 Japan .
61-15402 1/1987 Japan .
62-15403 1/1987 Japan .
62-15404 1/1987 Japan .

OTHER PUBLICATIONS

Nachrichtentech Electron, vol. 35 (4), pp. 151-154 (1985), "Bildverarbeitung mit Orthogonaltransformation".

Primary Examiner—David C. Nelms
Assistant Examiner—Crystal Cooper
Attorney, Agent, or Firm—Frishauf, Holtz, Goodman & Woodward

[57] ABSTRACT

A plurality of photocells are two-dimensionally arranged on a single light-image receiving plane. Each photocell is connected to first and second sum signal output lines. These lines receive output signals from the photocells through transmission switches, and output sum signals of these signals to an amplifier. The amplifier outputs the difference between the two signals received from the first and second sum signal output lines. A memory stores control signals including weighting data for controlling transmission, isolation, amplification factors, and/or an attenuation factors with respect to the individual transmission switches, and outputs the control signals to the transmission switches. Each transmission switch multiplies or does not multiply the output signal from the corresponding photocell with a specific amplification or attenuation factor, and transmits the product to the first or second sum signal output line. A memory controller writes the weighting data into the memory. A function generator outputs the weighting data of a two-dimensional function.

20 Claims, 7 Drawing Sheets

OPTICAL IMAGE TRANSFORMATION APPARATUS

BACKGROUND OF THE INVENTION

This invention relates to an optical image transformation apparatus and, in particular, to an optical image transformation apparatus which has a plurality of photocells, a memory, and a function generator, and outputs a total sum of output signals of the desired photocells in accordance with data associated with a weighting function generated by the function generator and stored in the memory, so that two-dimensional transformation of an optical image can be executed spatially-parallelly in real time.

Conventionally, the following two types of sensing devices for detecting and measuring an optical image or a spatially distributed pattern of irradiation light intensities and for extracting useful data are known.

(1) a device for transforming an image detected by a light-receiving section into electrical signals, and sequentially outputting the signals like a charge-coupled device (CCD); and (2) a device for outputting signals, in real time, which have been simultaneously processed in accordance with a spatial weighting function like an integrated spatial filter using a slit array.

As the latter device, those described in Japanese patent application No. 60-155462 "Non-contact Diameter Measuring Apparatus", Japanese patent application No. 60-155463 "Non-contact Diameter Measuring Apparatus", Japanese patent application No. 60-155464 "Non-contact Type Diameter Measuring Apparatus", and Japanese patent application No. 60-155465 "Non-contact Type Diameter Measuring Apparatus" by the same inventors as those of this invention are known. In these apparatuses, a slit array type spatial filter such as a photodetector array consisting of 2n rectangular photodetectors having the same dimension is used. These apparatuses execute spatially-parallel signal processings and output signals, in real time, the signals including data associated with a moving speed of a projected circular image and its diameter.

A "Variable Spatial Filter" described in Japanese patent application No. 61-64694 by the same inventors as those of this invention is also known as another example of the latter device. In this filter, a weighting function can be variable, and a signal processing scheme can be modified based on the variable weighting function.

The literature "Bildverarbeitung mit Orthogonal-transformation" Nachrichtentech Electron., Vol. 35(4), pp. 152-154 (1985), which is also another example of the latter device, proposes an idea for realizing an optical filter which uses two-dimensional orthogonal functions of two values "0" and "1" as an optical transmission intensity by a variable liquid-crystal matrix and performing spatial filtering in accordance with these functions as a weighting function. With this idea, the liquid-crystal matrix can serve as an optical filter having a spatial transmittance profile in accordance with the two-dimensional orthogonal function although it has two values of "1" and "0", i.e., a light-transmitting state and a light-shielding state. More specifically, the liquid-crystal matrix is nothing but a spatial filter. Since the liquid-crystal matrix has a variable property, although only two values of "0" and "1" are used, a plurality of types of spatial filters can be selectively realized due to external settings.

In the conventional devices of the former type, like a CCD, a detected image is transformed to time-serial electrical signals and the signals are sequentially output. Such a device can be connected to a versatile external signal processing system, can perform various kinds of signal processing, and can extract useful data. However, in such a device, when the signals are transferred to the processing system, all the image data must be sequentially transferred, and a predetermined time is required for image transfer. Therefore, the device cannot follow an object which moves faster than the predetermined time, and cannot obtain dynamic data for high speed objects.

A conventional device, such as the integrated spatial filter described above, performs parallel signal processing in accordance with a spatial weighting function to output signals including useful data in real time. Such a device is useful in obtaining dynamic data such as moving speed and direction of the high speed object. However, the device is not useful in changing the weighting function. Therefore, in such a device, signal processing is fixed, and cannot be modified.

The above-mentioned variable spatial filter is useful in changing a weighting function depending on the moving direction of an object and measuring moving speeds in various directions, but does not have the capability of performing two-dimensional transformation.

In signal processing utilizing two-dimensional orthogonal functions with the liquid-crystal matrix described in the above-mentioned literature, high voltage is required for driving the liquid crystal. High-speed switching cannot be performed, and the size of the device cannot be reduced.

SUMMARY OF THE INVENTION

This invention has been made in consideration with the above situation in mind. Its object is to eliminate the drawbacks of the conventional devices and to provide an optical image transformation apparatus, for executing two-dimensional transformation in real time, which can detect dynamic data of an optical image or a light pattern which cannot be realized by conventional devices and can easily change signal processing.

More specifically, an optical image transformation apparatus in accordance with this invention comprises: a plurality of photocells, two-dimensionally arranged on a single light-receiving plane, for outputting signals corresponding to the intensities of the received light; a first sum signal output line for receiving output signals from the photocells and transmitting a sum of the output signals; transmission switches, each of which is arranged between each of the photocells and the first sum signal output line, and has the capability of amplifying, attenuating, transmitting, and/or isolating the output signal from the corresponding photocell in accordance with a control signal, so as to amplify or attenuate the output signal from the corresponding photocell and/or transmit or not transmit it into the first sum signal output line; an amplifier for receiving the signal from the first sum signal output line and outputting a signal corresponding thereto; a memory for storing the control signals including the weighting data indicating the amplification factors, attenuation factors, and/or the information whether to transmit or isolate the transmission switches, and outputting the control signals for causing the transmission switches to perform amplification, attenuation, transmission, and/or isolation; a memory controller for writing the weighting data into the memory; and a function generator for generating weighting data of two-dimensional functions and transmitting the weighting data to the memory controller.

DETAILED DESCRIPTION OF THE PREFERRED EMBODIMENTS

In an optical image transformation apparatus in accordance with this invention, signals obtained from a planar detector array are processed with a variable weighting function to obtain a sum signal, or two sum signals are generated and the difference between them is obtained. For the weighting functions, orthogonal functions, such as trigonometric functions, Walsh functions, or the like are used.

The relationship between the two-dimensional functions and the two-dimensional transformation executed by the optical image transformation apparatus in this invention will be described. In general, when a two dimensional optical image $f(x,y)$ is defined as discrete data and the discrete data are represented by matrix $[F_{xy}]$, a two-dimensional transformation $[I_{ij}]$ by a certain matrix $[G_{xy}]$ is expressed by the following equation (1):

$$[I_{ij}] = [G_{xy}] \cdot [F_{xy}] \cdot [G_{xy}]^T \quad (1)$$

where $[G_{xy}]^T$ is the transposed matrix of $[G_{xy}]$.

$[I_{ij}]$ includes a specific value representing a feature of the image $f(x,y)$. It plays an important role in signal processing for two-dimensional optical images to extract useful data.

Elements of matrix $[I_{ij}]$ are calculated as follows:

$$I_{ij} = \Sigma_x \Sigma_y G_{ix} \cdot F_{xy} \cdot G_{jy} \quad (2)$$

If function $g(i,j,x,y)$ is defined as equation (3), equation (2) is rewritten accordingly:

$$g(i,j,x,y) = G_{ix} \cdot G_{jy} \quad (3)$$

$$I_{ij} = \Sigma_x \Sigma_y g(i,j,x,y) \cdot F_{xy} \quad (4)$$

$G_{ix}$ is considered as a function of x, and will be called a transformation function of an ith degree. In particular, if $[G_{ix}]$ is an orthogonal matrix, it is called an orthogonal function of an ith degree.

$g(i,j,x,y)$ will be called a two-dimensional transformation function of an (i,j)th degree as an extension of $G_{ix}$. In particular, if $G_{ix}$ is an orthogonal function, it is called a two-dimensional orthogonal function of an (i,j)th degree. As can be seen from equation (4), obtaining a two-dimensional transformation $I_{ij}$ is equivalent to taking a product of matrix $F_{xy}$ to be measured and the function $g(i,j,x,y)$ and taking a sum within an x-y plane. Equation (4) can be extended as shown in equation (5):

$$I_{ij} = \int_x \int_y g(i,j,x,y) \cdot f_{xy} \quad (5)$$

Note that equation (4) represents discrete processing of $f_{xy}$ into a rectangular matrix at equal intervals in vertical and horizontal directions. Equation (5) represents discrete processing of $f_{xy}$ at an arbitrary two-dimensional location. However, its principle is the same as that of equation (4).

As described above, the following capabilities are necessary for an optical image transformation apparatus which executes an arithmetic operation of equation (4) or (5) at high speed:

(1) a capability for multiplying irradiation light intensity at light-receiving point (x, y) with corresponding function $g(i,j,x,y)$ to output a product;

(2) a capability for adding all the products at points (x,y);

(3) a capability for executing the above mentioned multiplications and additions regardless of a sign of the value $g(i,j,x,y)$;

(4) a capability for simultaneously executing the multiplications and additions in real time; and (5) a capability for externally changing the degrees i and j of function $g(i,j,x,y)$.

Figure 1:
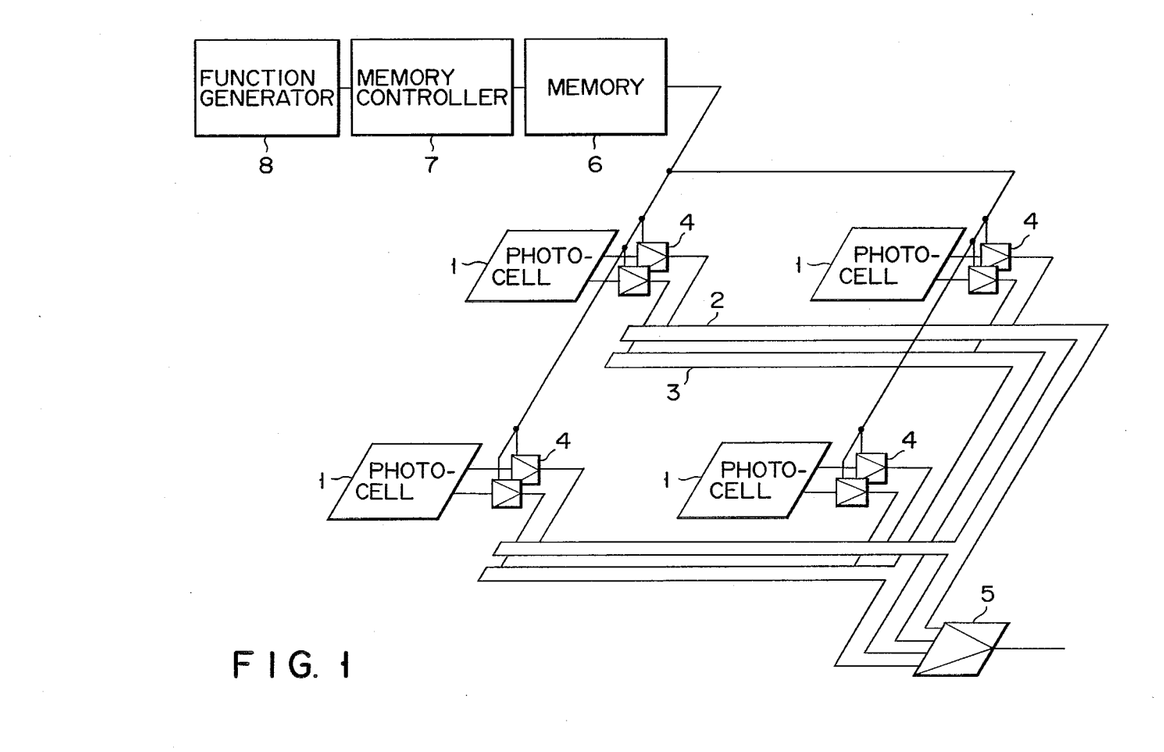
FIG. 1 is a block diagram schematically showing the optical image transformation apparatus according to an embodiment of this invention.

An optical image transformation apparatus in according with this invention which can realize the above-mentioned parallel and variable processing will be described with reference to the accompanying drawings. FIG. 1 shows the arrangement of an embodiment of this invention. A plurality of photo-cells 1 are two-dimensionally arranged on a single light-receiving plane. These photocells 1 respectively detect an optical image or a projected light pattern as an object to be measured. For example, each photocell 1 is realized by a silicon photodiode for outputting a photo-current corresponding to irradiated light intensity. In FIG. 1, four photocells 1 are used.

Each photocell 1 is connected to first and second sum signal output lines 2 and 3. Output lines 2 and 3 are, e.g., conductive wires made of thin metal films formed on a substrate. These first and second output lines 2 and 3 receive output signals from photocells 1 through corresponding transmission switch 4, and output sum signals to amplifier 5. More specifically, first and second output lines 2 and 3 receive output signals such as photo-currents from one or a plurality of photocells 1 upon switching of transmission switches 4, and output sum signals of these output signals to amplifier 5.

Note that each switch 4 has a capability for amplifying, attenuating, transmitting, and/or isolating an output signal from photocell 1 in accordance with a control signal. For example, switch 4 preferably comprises a silicon FET which is capable of switching transmission, isolation, amplification, and attenuation in response to a gate voltage (the control signal). In the photo-transformation apparatus shown in FIG. 1, eight transmission switches 4 are adopted so that transmission for all the combinations of four photocells 1 and first and second sum signal output lines 2 and 3 can be attained. However, each switch 4 can be a 2-output selector which can selectively output an input signal to first or second output line 2 or 3 in accordance with the control signal. In this case, four 2-output transmission switches 4 can be used for four photocells 1.

Amplifier 5 outputs a difference signal between two signals received from the first and second output lines 2 and 3 to a recorder (not shown). Amplifier 5 is, for example, a differential amplifier realized by an analog semiconductor.

Memory 6 stores the control signals including weighting data for controlling transmission, isolation, the amplification factors, and/or the attenuation factors for individual switches 4. Memory 6 has the capability of outputting the control signals to switches 4. Memory 6 can be realized by, e.g., flip-flops of silicon transistors. More specifically, memory 6 stores the control signals including weighting data. Memory 6 outputs control signals to switches 4 and causes each switch 4 to multiply a specific amplification or attenuation factor with an output signal from photocell 1, and/or to output the multiplied signal to one of the output lines 2 and 3 as indicated by the weighting data.

Memory controller 7 is used to write the weighting data in memory 6. For example, controller 7 comprises column and row decoders, column selection switches, and the like. Function generator 8 has the capability of outputting a value of two-dimensional functions, such as two-dimensional cosine functions, two-dimensional Haar functions, or two-dimensional Walsh functions. Function generator 8 can comprise a microprocessor or the like.

More specifically, function generator 8 outputs value $g(i,j,x,y)$ of a two-dimensional function of a corresponding degree (to be referred to as the weighting function) in accordance with designated degrees $i$, $j$, and the like from an external device. The weighting data causes each transmission switch 4 to multiply an output signal from the corresponding photocell 1 at an xth row and at a yth column with $g(i,j,x,y)$. The weighting data is written in memory 6 through memory controller 7.

When $g(i,j,x,y)$ is a positive value, switch 4 transmits the signal $g(i,j,x,y)$ to first sum signal output line 2. When $g(i,j,x,y)$ is a negative value, switch 4 transmits the signal of $g(i,j,x,y)$ to second sum signal output line 3. Amplifier 5 outputs the difference between the two signals transmitted through output lines 2 and 3. Therefore, an operation for multiplying positive and negative values $g(i,j,x,y)$ with output signals from photocell 1 can be easily performed.

Note that photocells 1 need not be arranged in a rectangular matrix with equal intervals in the horizontal and vertical directions but can be arranged on the concentrical circles, or can be arranged in a honeycomb-like hexagonal high density matrix, or the like.

In particular, in the method for arranging photo-cells 1 in a rectangular matrix at equal intervals in the horizontal and vertical directions, weighting data $g(i,j,x,y)$ is generated by calculating the product of two values of one-dimentional functions like $g(i,j,x,y)=G_{ix} \cdot G_{jy}$. As compared to another method in which it is calculated without the product operation, weighting data can be generated more easily and at higher speeds.

Two-dimensional functions as weighting data are not limited to the ones described above. For example, various other two-dimensional functions can be used, so that averages of adjacent points can be used for smoothing applications; a gradient can be detected using differential weight; edges can be emphasized using Laplacian weight, and so on. As two-dimensional functions, particularly in methods using two-dimensional orthogonal functions, if two-dimensional trigonometric functions are used, they can be applied to two-dimensional frequency analysis of an image to be measured. Furthermore, as two-dimensional orthogonal functions, if two-dimensional Walsh functions are used, they can be applied to two-dimensional sequency analysis of an image to be measured. In this manner, the apparatus of this embodiment can be applied to spectral analysis in an extended sense in a spectrum corresponding to specific two-dimensional orthogonal functions used.

When two-dimensional orthogonal functions are used as two-dimensional functions of a weighting function, they are not limited to the ones mentioned above. For example, various other two-dimensional orthogonal functions such as two-dimensional trigonometric functions, two-dimensional Walsh functions, two-dimensional Haar functions, and the like, can be used. In particular, when two-dimensional Walsh functions wal$(i,j,x,y)$ are used as two-dimensional functions $g(i,j,x,y)$, wal$(i,j,x,y)$ take only two values "$+1$" and "$-1$". Therefore, no amplification and attenuation capabilities are required for transmission switches 4, and the configuration can be simplified. Therefore, this configuration is particularly suitable in an integrated circuit, and an optical image transformation apparatus having two-dimensional sequency analysis capability can be realized.

Furthermore, transmission switches 4 can be realized by other means. For example, switches 4 can be realized by electrical amplifiers or attenuators whose outputs charge in accordance with weighting data $g(i,j,x,y)$.

If 2-output selectors are used as transmission switch 4, weighting data $g(i,j,x,y)$ can be approximated with values "$+1$" or "$-1$", and two-dimensional transformation are executed. In addition, the configuration can be simplified, and is suitable in an integrated circuit. When binary functions such as two-dimensional Walsh functions wal$(i,j,x,y)$ are used as the two-dimensional functions, an optical image transformation apparatus which can execute two-dimensional transformation with sufficient precision without approximation can be realized.

The shape and structure of the components of the photo-transformation apparatus of this invention are not limited to those in the above embodiments. Therefore, if the main part is integrated to form an integrated structure, since this structure includes repetitions of basic components such as photocell portions, memory-cells, and the like, only two signal output lines are required regardless of the number of photocells. Therefore an integrated optical image transformation apparatus which effectively takes advantage of the semiconductor integrated circuit technique can be realized. Furthermore, if a multilayered structure of two layers or more is adopted, when photocells are arranged on the uppermost layer, the photocells can occupy almost the entire area of the light-receiving plane. With this structure, most of the entire area of the light-receiving plane can be effectively utilized without being occupied by a memory, wiring lines, and the like. Consequently, an integrated optical image transformation apparatus which effectively takes advantage of the semiconductor integrated circuit technique can be realized.

When a memory is divided into sections (cells) for storing weighting data of individual photocells and the sections are arranged adjacent to the corresponding photocells, the wiring distance between each photocell and the memory section can be shortened. Therefore, since the area occupied by the entire wiring lines can be reduced, an integrated optical image transformation apparatus which effectively takes advantage of the semiconductor integrated circuit technique can be realized.

Figure 2:
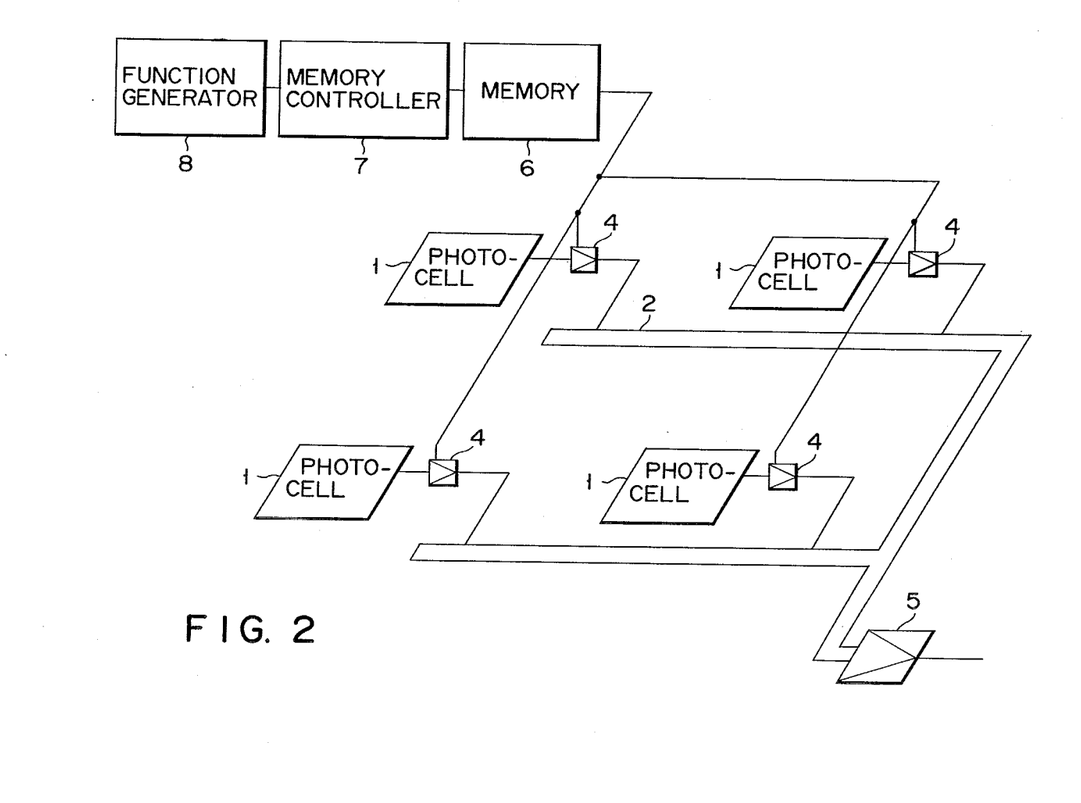
FIG. 2 is a block diagram schematically showing an arrangement of another embodiment.

FIG. 2 shows an arrangement of another embodiment of this invention. The arrangement of this embodiment is substantially the same as that in the above embodiment, except that a single sum signal output line is adopted. Therefore, in this embodiment, positive values $g(i,j,x,y)$ can be treated but negative values $g(i,j,x,y)$ cannot be treated. If negative values $g(i,j,x,y)$ are necessary, predetermined constant bias value $g_0$ is added and non-negative values $g_0+g(i,j,x,y)$ are used in place of $g(i,j,x,y)$, thus allowing the operation.

Figure 3:
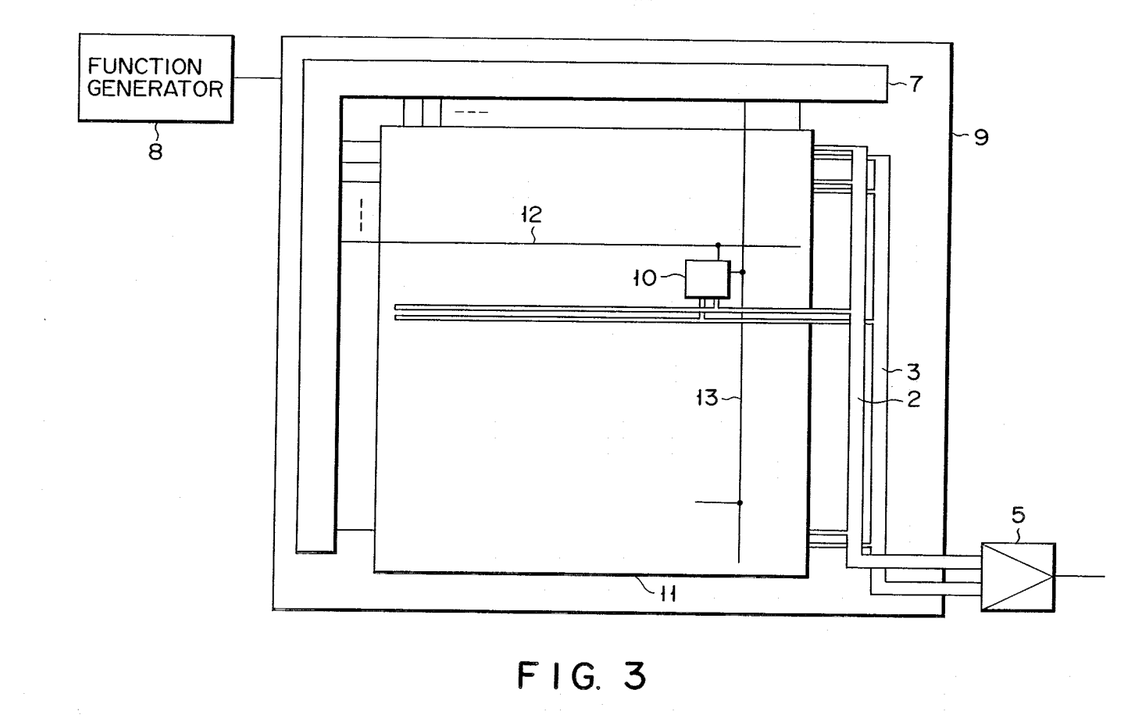
FIG. 3 is a detailed view showing an arrangement near the light-receiving region of the optical image transformation apparatus shown in FIG. 1.
Figure 4:
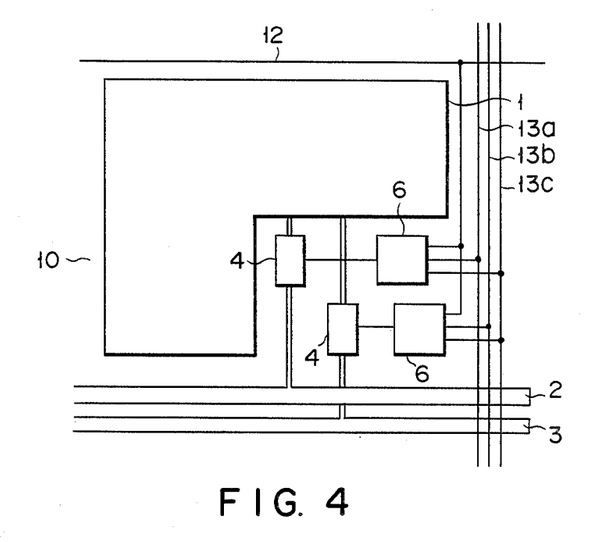
FIG. 4 is a detailed view showing an arrangement near a photocell of the optical image transformation apparatus shown in FIG. 1.
Figure 5:
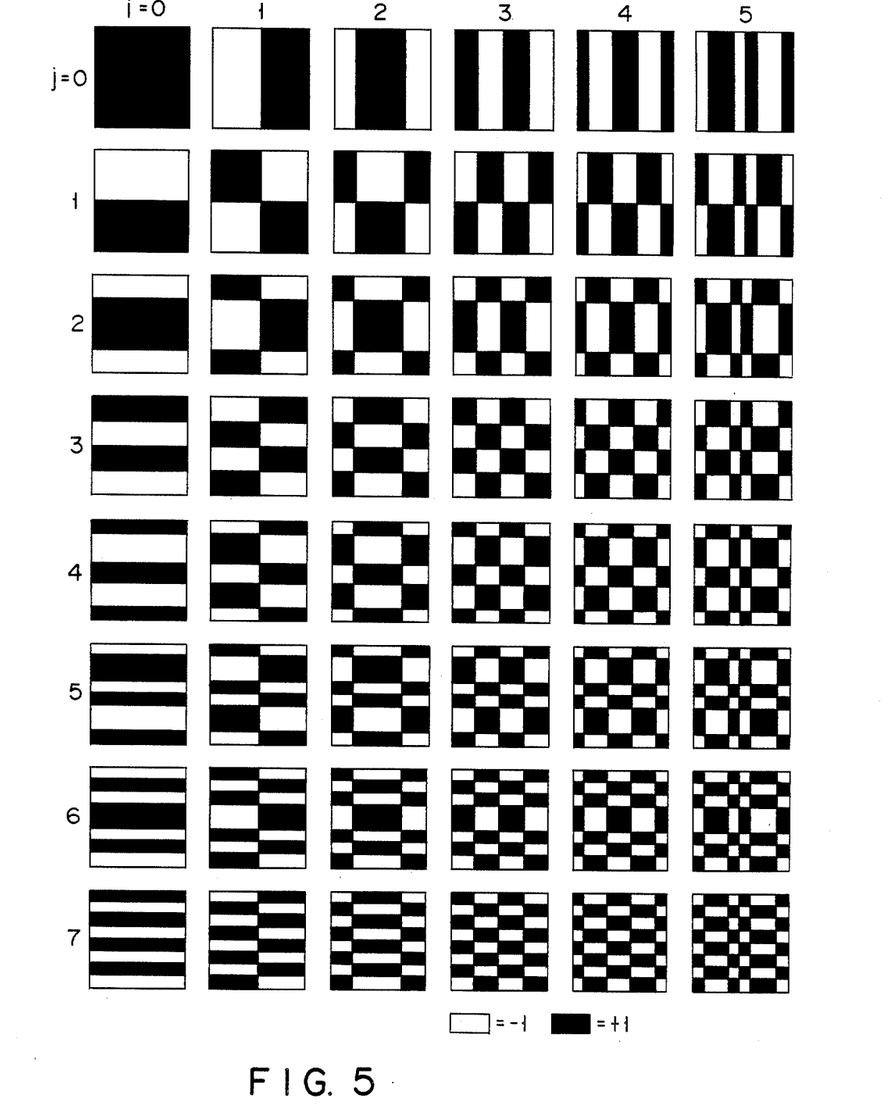
FIG. 5 is a view showing two-dimensional Walsh functions.

FIGS. 3 and 4 show in detail the arrangement of the embodiment shown in FIG. 1. More specifically, FIG. 3 shows in detail the arrangement near a light-receiving region, and FIG. 4 shows in detail the arrangement near the photocells. In this embodiment, two-dimensional Walsh functions $wal(i,j,x,y)$ are employed as the weighting data $g(i,j,x,y)$. Therefore, as the function generator 8, a Walsh function generator is adopted. FIG. 5 shows the two-dimensional Walsh function.

FIG. 3 illustrates first and second sum signal output lines 2 and 3, and memory controller 7. In FIG. 3, the interior of light-receiving region 11 in which pixels 10 including photocells are arranged on the substrate 9 is schematically illustrated.

Light-receiving region 11 includes a large number of pixels 10 which are arranged in a 32×32(=1024) matrix in horizontal and vertical directions. Each pixel 10 is connected to a single word line 12 and one or more data lines 13 and connected to the memory controller 7. When these lines are appropriately selected, an arbitrary pixel can be selected, and desired data can be written in a cell of a memory in the selected pixel. FIG. 3 illustrates wiring of these lines for a single pixel 10 out of 1024 pixels 10. However, in reality, the lines are connected to all pixels 10.

The characteristic feature of this invention lies in the configuration that the sum signal output lines for the output signals are connected to all pixels 10, and a sum of all the output signals from all the photocells that are indicated by the weighting data are simultaneously output into first and second output lines 2 and 3 in real time. Weighting data $wal(i,j,x,y)$ takes only two values "+1" or "−1", as shown in FIG. 5. Therefore, in accordance with x and y of each photocell, all the outputs from the photocells of $wal(i,j,x,y)=+1$ are connected to the first sum signal output line 2, and all the outputs from the photocells of $wal(i,j,x,y)=-1$ are connected to the second sum signal output line 3. More specifically, the sums of all the signals from the desired photocells in light-receiving region 11 can be output through the first and second sum signal output lines 2 and 3 in real time.

FIG. 4 shows the internal structure of a single pixel 10, and a wiring structure near a photocell 1 for transmitting output signals from photocells 1 into output lines 2 and 3 through transmission switches 4. In this embodiment, memory 6 is divided into sections (cells) for storing the weighting data of individual photocells and the sections include a flip-flop similar to a conventional static RAM (SRAM). As shown in FIG. 4, in this embodiment, one pixel includes two cells of memory 6, and requires a single word line 12 and two data lines 13 for each cell of memory 6 in the same manner as in the conventional SRAM. However, among the data lines for two cells of memory 6, data line 13c for indicating the address of each cell is commonly used in addition to data lines 13a and 13b for indicating contents of the cells. Therefore, three data lines are used.

When a bit of electrical data stored in the corresponding cell of memory 6 is logic value "1", the corresponding transmission switch 4 performs a transmission operation. When a bit of the electrical data stored in a corresponding cell of memory 6 is at logic value "0", it performs a cut-off operation. With this configuration, an output signal from an arbitrary photocell 1 can be output into first and second sum signal output lines 2 and 3.

In this embodiment, after specific degrees i and j are indicated, the image $f_{xy}$ of interest is parallelly transformed in real time in accordance with the two-dimensional Walsh functions, thereby outputting its (i,j)th degree element $I_{ij}$. More specifically, two-dimensional sequency analysis of an image of interest is parallelly executed, and the (i,j) component of the two-dimensional sequency spectrum is output in real time. Therefore, the (i,j) component of a sequency spectrum of an image of interest which moves at high speed or changes rapidly can be detected in real time.

When is and js are switched at high speed, the two-dimensional sequency spectra of an image of interest can be sequentially detected in accordance with is and js. Furthermore, degrees i and j which best represent the features of an image of interest can be selectively set at the first step, and the major features of the image of interest are detected in accordance with the output signal at that time. Then, more detailed features to be detected and degrees i and j that best represent the detailed features are determined in accordance with the major features at the next step, and thereafter, feature extraction is performed, step by step. In this manner, feature extraction, pattern classification, shape identification, recognition, and the like of an image of interest can be performed. In this embodiment, various measurement operations can be performed by a single device.

Figure 6:
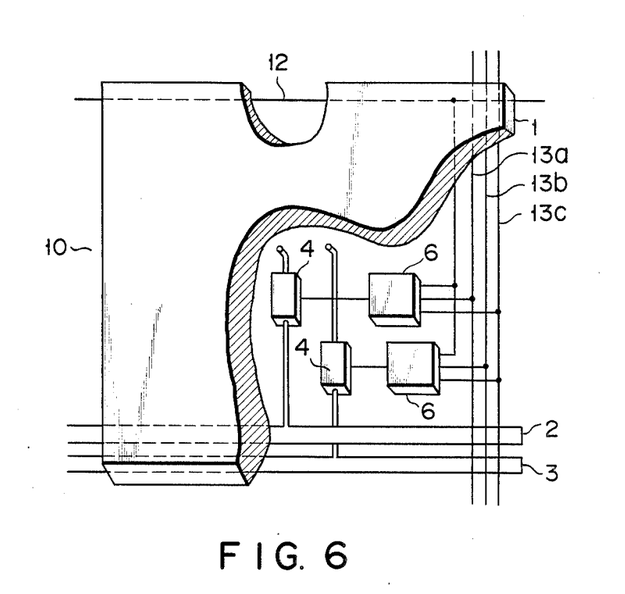
FIG. 6 is a partially cutaway view of a photocell showing another embodiment in detail.

FIG. 6 shows the arrangement near a photocell according to another embodiment. In this embodiment, photo-cells 1, first and second sum signal output lines 2 and 3, transmission switches 4, memories 6, and memory controller 7 are integrated in a two-layered structure, thus forming a three-dimensional integrated structure. In this case, since photocells 1 are arranged on the uppermost layer, the entire upper surface of an integrated device can be effectively utilized, and all the irradiated light can be received. Note that the peripheral portion not shown in FIG. 6 is the same as that in the above embodiments.

Figure 7:
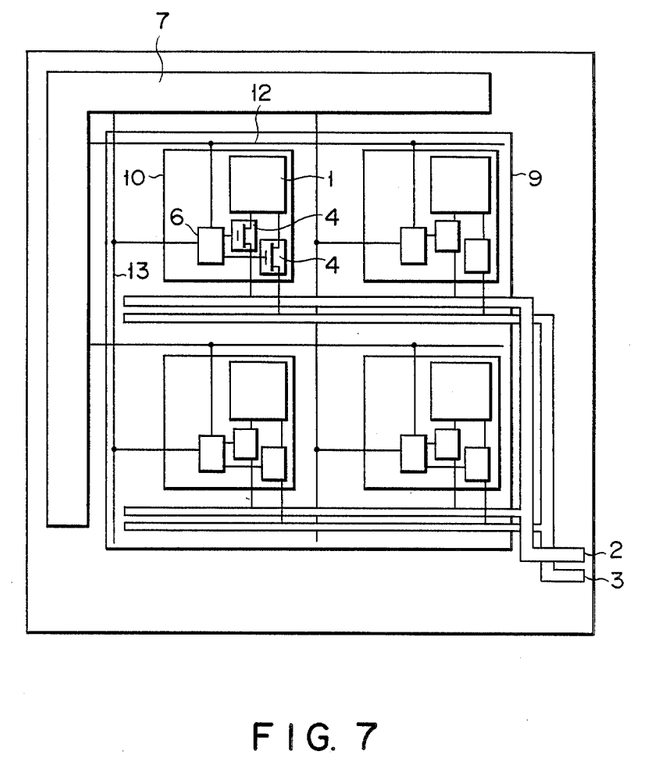
FIG. 7 is a view showing still another embodiment of the arrangement near the light-receiving region and the photocells.
Figure 8A:
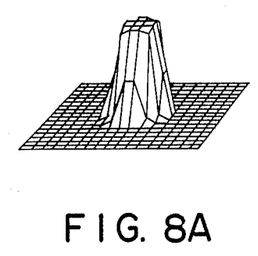
FIGS. 8A, 8b, and 8C are views showing light intensity distributions of three square images having different dimensions.
Figures 8B, 8C:
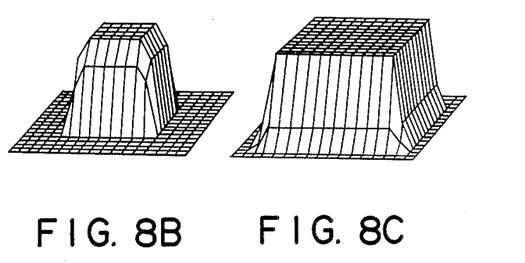
Figure 9A:
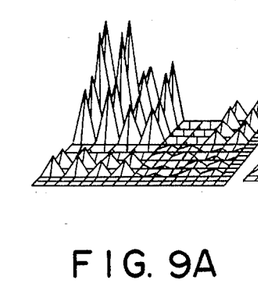
FIGS. 9A, 9B, and 9C are views showing Walsh-Hadamard transformation results of objects obtained by a theoretical calculation corresponding with FIGS. 8A to 8C.
Figure 9B:
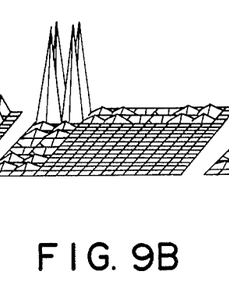
Figure 9C:
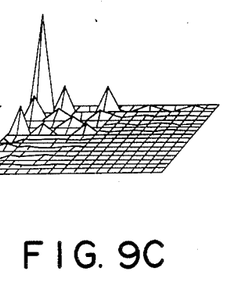
Figure 10A:
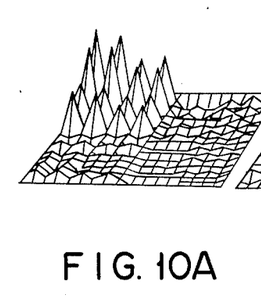
FIGS. 10A, 10B, and 10C are views showing the actual experimental results corresponding with FIGS. 9A to 9C.
Figure 10B:
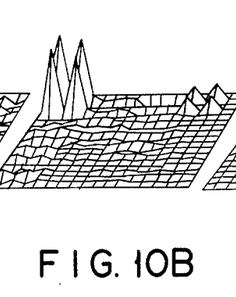
Figure 10C:
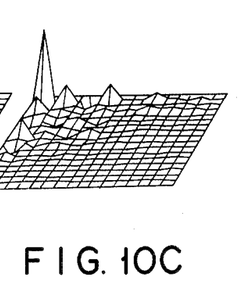

Device samples were fabricated, and the operation test was conducted to ensure the capabilities of this invention by the inventors. In these samples, an integrated structure near the light-receiving region is shown in FIG. 7. FIG. 7 illustrates four photocells 1 for simplicity. In the actual device sample, 256 photocells 1 are integrated in a 16 (rows)×16 (columns) matrix. Square images of different dimensions were received by the device sample, and two-dimensional Walsh-Hadamard transformation was carried out. More specifically, FIGS. 8A to 8C show projected light intensity distributions of three square images having different dimensions used in the experiment. FIGS. 9A to 9C show the Walsh-Hadamard transformation results of the images obtained by theoretical calculation in correspondence with FIGS. 8A to 8C. FIGS. 10A to 10C show the actual experimental results. As can be seen from these drawings, the operation of the device sample is in excellent agreement with the theory.

In the above embodiments, flip-flops equivalent to ones used in SRAMs are adopted as the memory 6. Instead, if circuits of a memory cell of a dynamic RAM (DRAM) are adopted, the same operation can be performed by compact cells which are more advantageous for integrated circuits. If a programmable ROM (PROM) is used as the memory 6, a programmable optical image transformation apparatus which can set predetermined weight in accordance with applications can be realized by a single chip.

According to the invention described above, an optical image transformation apparatus which can attain both dynamic data processing and transformation using a variable weighting function is developed. This optical image transformation apparatus has a spatially parallel signal processing capability suitable for obtaining two-dimensionally transformed data of an irradiated and projected image, and can output a real-time signal. In addition, if weighting data is rewritten, various other two-dimensional transformation operations are selectively executed by a single device. The number of sum signal output lines is 1 or 2 regardless of the number of photocells. Therefore, the structure of this invention is suitable in an integrated circuit.

What is claimed is:

1. An optical image transformation apparatus for two-dimensionally transforming an intensity distribution of received light, comprising:
   a plurality of photocell means, two-dimensionally arranged on a single light-receiving plane, for outputting signals corresponding to the intensities of the received light;
   first sum signal output line means for receiving signals output from said photocell means, and for transmitting a signal corresponding to the sum of the output signals to the outside;
   transmission switching means, each of which is arranged between each of said photocell means and said first sum signal output line means in correspondence with said photocell means, and has a capability for amplifying, attenuating, transmitting, and isolating the output signal from the corresponding photocell means in accordance with a control signal, so as to amplify or to attenuate the output signal from the corresponding photocell means and to transmit or not to transmit it into said first sum signal output line means;
   memory means for storing the control signals including weighting data for indicating the amplification factors, the attenuation factors, and the information whether to transmit or isolate for said transmission switching means, and for outputting the control signals for causing said transmission switching means to perform amplification, attenuation, transmission, or isolation;
   memory control means for writing the weighting data into said memory means; and
   function generating means for generating the weighting data of two-dimensional functions, and for transmitting the weighting data to said memory control means.

2. An apparatus according to claim 1, wherein said photocell means, said sum signal output line means, said transmission switching means, said memory means, and said memory control means are integrated to form an integrated structure.

3. An apparatus according to claim 1, wherein said photocell means, said sum signal output line means, said transmission switching means, said memory means, and said memory control means are integrated in a multilayered structure of two layers or more, thereby forming a three-dimensional integrated structure.

4. An apparatus according to claim 1, further comprising second sum signal output line means for receiving the output signals from said photocell means, and for transmitting a signal corresponding to the sum of the output signals; and amplifier means for receiving the signals from said first and said second sum signal output line means, and for outputting a difference between the two said line means to the outside, wherein each of said transmission switching means is arranged between each of said photocell means and said first and said second sum signal output line means in correspondence with said photocell means, and has a capability for amplifying, attenuating, transmitting, and isolating the output signal from the corresponding photocell means in accordance with a control signal, so as to transmit the output signal from the corresponding photocell means into one of said first and said second sum signal output line means after amplifying or attenuating the output signal, or not to transmit the output signal, and said memory means stores the control signals including the weighting data for indicating the amplification factors, the attenuation factors, and the information whether to transmit or isolate said transmission switching means, and outputs the control signals for causing said transmission switching means to perform amplification, attenuation, transmission, or isolation.

5. An apparatus according to claim 4, wherein said photocell means, said first and second sum signal output line means, said transmission switching means, said memory means, and said memory control means are integrated to form an integrated structure.

6. An apparatus according to claim 4, wherein said photocell means, said first and second sum signal output line means, said transmission switching means, said memory means, and said memory control means are integrated in a multilayered structure of two layers or more, thereby forming a three-dimensional integrated structure.

7. An optical image transformation apparatus for two-dimensionally transforming an intensity distribution of received light, comprising:
   a plurality of photocell means, two-dimensionally arranged on a single light-receiving plane, for outputting signals corresponding to the intensities of the received light;
   first sum signal output line means receiving signals output from said photocell means, and for transmitting a signal corresponding to the sum of the output signals to the outside;

transmission switching means, each of which is arranged between each of said photocell means and said first sum signal output line means in correspondence with said photocell means, and has a capability for transmitting or isolating the output signal from the corresponding photocell means in accordance with a control signal, so as to transmit or not to transmit the output signal from the corresponding photocell means to said first sum signal output line means;

memory means for storing the control signals including weighting data for indicating the information whether to transmit or isolate for said transmission switching means, and for outputting the control signals for causing said transmission switching means to perform transmission, or isolation;

means control means for writing the weighting data into said memory means; and function generating means for generating the weighting data of two-dimensional functions, and for transmitting the weighting data to said memory control means.

8. An apparatus according to claim 7, wherein said plurality of photocell means are arranged in a rectangular matrix at equal intervals in horizontal and vertical directions, the two-dimensional functions are two-dimensional Walsh functions, and said transmission switching means includes transmission gates which can be cut off.

9. An apparatus according to claim 7, wherein said photocell means, said sum signal output line means, said transmission switching means, said memory means, and said memory control means are integrated to form an integrated structure.

10. An apparatus according to claim 7, wherein said photocell means, said sum signal output line means, said transmission switching means, said memory means, and said memory control means are integrated in a multilayered structure of two layers or more, thereby forming a three-dimensional integrated structure.

11. An apparatus according to claim 8, wherein said photocell means, said sum signal output line means, said transmission switching means, said memory means, and said memory control means are integrated to form an integrated structure.

12. An apparatus according to claim 8, wherein said photocell means, said sum signal output line means, said transmission switching means, said memory means, and said memory control means are integrated in a multilayered structure of two layers or more, thereby forming a three-dimensional integrated structure.

13. An apparatus according to claim 7, further comprising second sum signal output line means for receiving the output signals from said photocell means, and for transmitting a signal corresponding to the sum of the output signals; and amplifier means for receiving the signals from said first and said second sum signal output line means, and for outputting a difference between the two said line means to the outside, wherein each of said transmission switching means is arranged between each of said photocell means and said first and said second sum signal output line means in correspondence with said photocell means, and has a capability for transmitting and isolating the output signal from the corresponding photocell means in accordance with a control signal, so as selectively to transmit or not to transmit the output signal from the corresponding photocell means to one of said first and said second sum signal output line means, and said memory means stores the control signals including the weighting data for indicating the information whether to transmit or isolate said transmission switching means, and outputs the control signals for causing said transmission switching means to perform transmission or isolation.

14. An apparatus according to claim 13, wherein said plurality of photocell means are arranged in a rectangular matrix at equal intervals in horizontal and vertical directions, the two-dimensional functions are two-dimensional Walsh functions, and said transmission switching means includes 2-output selectors which can selectively output the signals to one of said first and said second sum signal output line means.

15. An apparatus according to claim 13, wherein said photocell means, said first and said second sum signal output line means, said transmission switching means, said memory means, and said memory control means are integrated to form an integrated structure.

16. An apparatus according to claim 13, wherein said photocell means, said first and said second sum signal output line means, said transmission switching means, said memory means, and said memory control means are integrated in a multilayered structure of two layers or more, thereby forming a three-dimensional integrated structure.

17. An apparatus according to claim 14, wherein said photocell means, said first and said second sum signal output line means, said transmission switching means, said memory means, and said memory control means are integrated to form an integrated structure.

18. An apparatus according to claim 14, wherein said photocell means, said first and said second sum signal output line means, said transmission switching means, said memory means, and said memory control means are integrated in a multilayered structure of two layers or more, thereby forming a three-dimensional integrated structure.

19. An optical image transformation apparatus for two-dimensionally transforming an intensity distribution of received light, comprising:

a plurality of photocell means, two-dimensionally arranged on a single light-receiving plane, for outputting signals corresponding to the intensities of the received light;

sum signal output line means for receiving signals output from said photocell means, and for transmitting a signal corresponding to the sum of the output signals to the outside;

transmission switching means, each of which is arranged between each of said photocell means and said sum signal output line means in correspondence with said photocell means, and has a capability for amplifying, attenuating, transmitting, and isolating the output signal from the corresponding photocell means in accordance with a control signal, so as (1) to amplify the output signal from the corresponding photocell means and transmit it to said sum signal output line means, (2) to attenuate the output signal from the corresponding photocell means and transmit it to said sum signal output line means, (3) to transmit the output signal from the corresponding photocell means, or (4) not to transmit the output signal from the corresponding photocell means; and control means for controlling said transmission switching means by supplying the control signals thereto, the control signals including weighting data for indicating the amplification factors, the attenuation factors, and the information whether to transmit or isolate for said transmission switching means.

20. An apparatus according to claim 19, wherein said control means includes:

memory means for storing the control signals, and for outputting the control signals for causing said transmission switching means to perform amplification, attenuation, transmission, or isolation;

memory control means for writing the weighting data into said memory means; and function generating means for generating the weighting data of two-dimensional functions, and for transmitting the weighting data to said memory control means.

* * * * *